Feb. 11, 1930.  C. E. SHULER  1,746,613
WAVE MOTOR
Filed Nov. 8, 1927  2 Sheets-Sheet 1
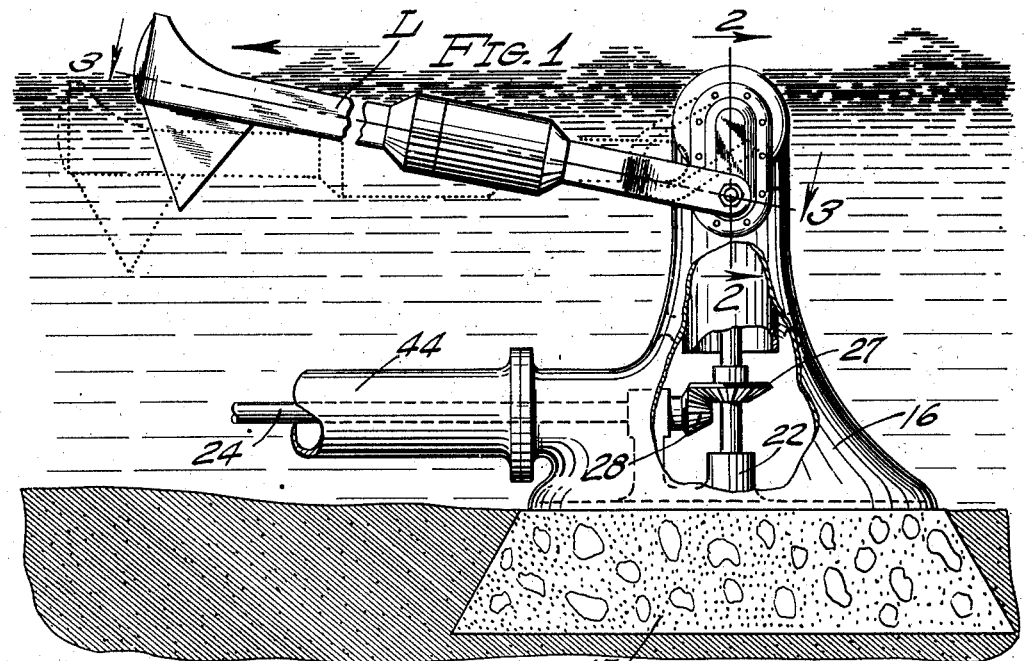
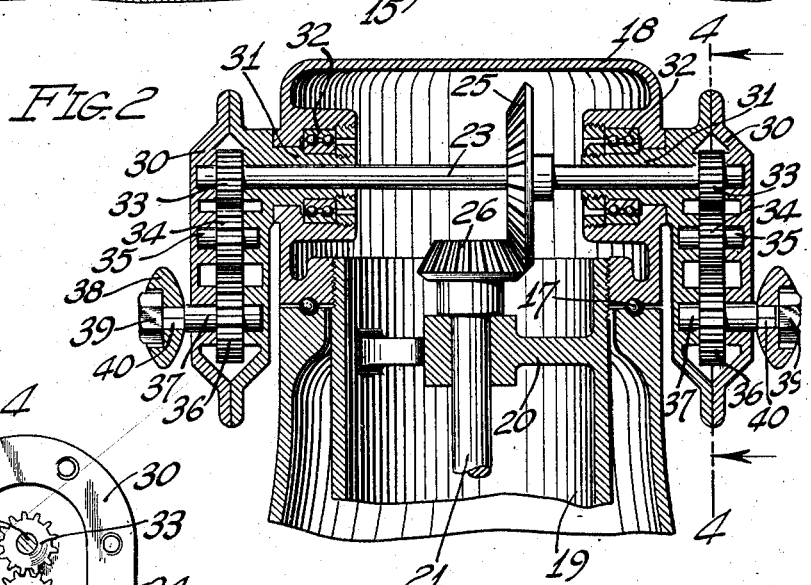
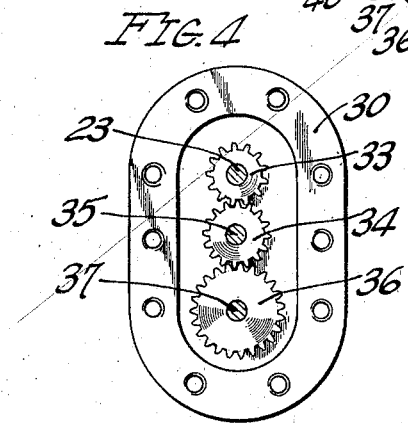
INVENTOR
CHESTER E. SHULER
BY Munn &G.
ATTORNEY Feb. 11, 1930.   C. E. SHULER   1,746,613
WAVE MOTOR
Filed Nov. 8, 1927   2 Sheets-Sheet 2
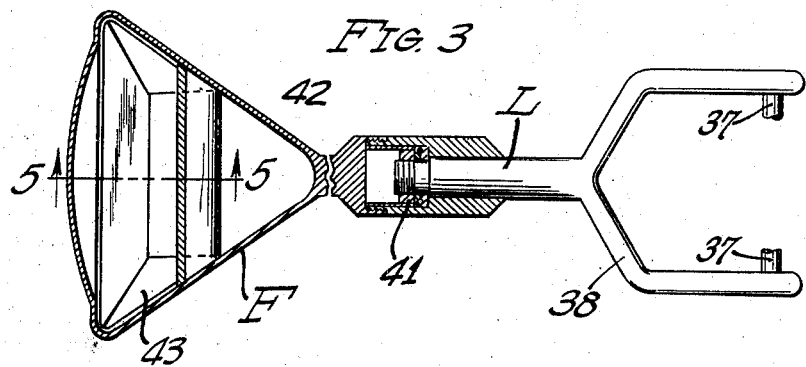
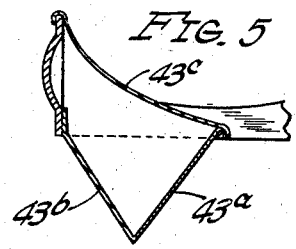
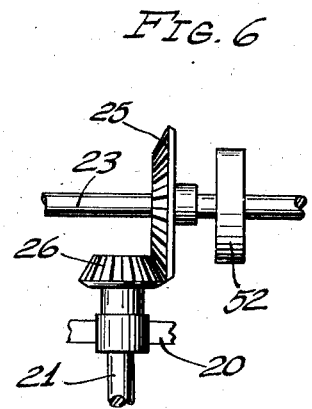
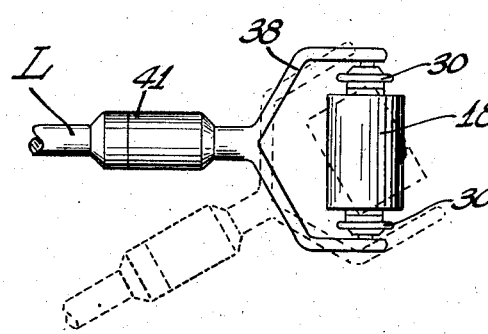
INVENTOR
CHESTER E. SHULER
BY Munn & Co.
ATTORNEY Patented Feb. 11, 1930

1,746,613

UNITED STATES PATENT OFFICE

CHESTER E. SHULER, OF LOS ANGELES, CALIFORNIA

WAVE MOTOR

Application filed November 8, 1927. Serial No. 231,905.

My invention relates to wave motors, and it has for a purpose the provision of a wave motor which is characterized by its responsiveness to record every impulse of the water due to wave motion, roll, weight of water and undertow, and to convert such impulses into power to perform useful work. My invention is further characterized by its ability to adapt itself to every change of tide or flow so that it may respond to all water power impulses at all times and thereby secure a continuous flow and maximum amount of power.

Another purpose of my invention is the provision of a mechanism by which the wave power so converted by the motor is stored and can be released as desired.

I will describe only one type of wave motor and one type of power accumulator embodying my invention and will then point out the novel features in claims.

In the accompanying drawing:

Fig. 1 is a view showing in side elevation one form of wave motor embodying my invention;

Fig. 2 is an enlarged vertical sectional view taken on the line 2—2 of Fig. 1;

Fig. 3 is a horizontal sectional view taken on the line 3—3 of Fig. 1;

Fig. 4 is a vertical sectional view taken on the line 4—4 of Fig. 2;

Fig. 5 is a vertical sectional view taken on the line 5—5 of Fig. 3;

Fig. 6 is a view showing in side elevation a modified arrangement of power transmitting mechanism;

Fig. 7 is a plan view on a reduced scale of the wave motor float illustrating in dash lines one horizontal position which the float lever can occupy.

Referring specifically to the drawings and particularly to Fig. 1, the wave motor embodying my invention comprises a suitable base 15 formed of concrete or any other suitable material and which, as shown, is imbedded in the earth constituting the bottom of the body of water in which the motor operates. Suitably secured to the base 15 is a hollow standard 16 formed of any suitable material such as non-corrosive metal and having a lower end of considerable area which merges into the smaller upper end to provide a standard of a height which terminates ordinarily beneath the surface of the water in which the motor operates. By means of ball-bearings 17 a hollow head 18 is rotatably mounted on the upper end of the standard, as clearly illustrated in Fig. 2, and attached to this head is a sleeve 19 of suitable diameter and length to provide a ballast for the head 18 so as to maintain the latter in rotative relation on the standard. Within the sleeve 19 is one or more spiders 20 in which a vertical shaft 21 is journaled. The lower end of the shaft, as illustrated in Fig. 1, is rotatable in a bearing 22. Thus, the shaft is properly supported in vertical position to maintain operative engagement with an upper horizontal shaft 23 and a lower horizontal shaft 24 through the medium of mitre gears 25 and 26, and 27 and 28, respectively.

The shaft 23 is mounted in the head 18 and its ends are journaled in arms 30 and extensions 31 of the arms, which latter are journaled in bearings 32 and provide pivot points about which the arms 30 are adapted to oscillate. Each arm is divided longitudinally into two sections, as illustrated in Fig. 2, these sections being suitably clamped together and constructed to provide bearings in which one end of the shaft 23 is received. The arm sections are also constructed to receive a gear 33 fixed to the shaft 23, a second gear 34 fixed to a stub shaft 35, and a third gear 36 fixed to a stub shaft 37 which projects from the arm for attachment to a lever designated generally at L.

As shown in Figs. 3 and 7, the lever L comprises a Y-shaped yoke 38, the diverging portions of which are mounted on the stub shafts and secured thereto by means of nuts 39. It is to be noted that portions of the shafts are angular, as indicated at 40, to fit within correspondingly shaped openings of the yoke 38 wherby the yoke is fixed to the stub shafts to oscillate the latter when the yoke is rocked. The linear portion of the yoke has a swivel connection 41 with a float indicated generally at F and comprising, in the present instance, a triangular frame 42 and a float body 43 having reversely inclined side surfaces 43ª and 43$^b$ and a downwardly curved top surface 43$^c$. Adjacent portions of the frame 42 are curved upwardly to correspond with the curvature of the top surface 43$^c$ and another portion of the frame is bowed, as clearly shown in Figs. 3 and 5, to reinforce the frame and float body.

In practice, the float F normally assumes the position shown in solid lines in Fig. 1, and in which position the lever L is inclined with respect to the horizontal while the arms 30 are disposed vertically, it being understood that the arms naturally gravitate to vertical position. In the normal position of the float its curved surface 43$^c$ is presented to the waves on the surface of the water in which the motor operates, it being important to note that the standard 16 is completely submerged so as not to interfere with the action of the waves on the float. In actual practice the waves impinge against the surface 43$^c$ of the float and in so doing operate to impel the lever L in the direction of the arrows in Fig. 1, thus causing the lever to occupy some such position as shown in dotted line position. In moving to this position the lever swings the arms 30 upwardly to the position shown thereby rotating the shaft 23 through the operative connection provided by the gears 33, 34, and 36. After the force of any one wave has spent itself on the float F, the lever and arms naturally return to normal position thus causing further rotation of the shaft 23 but in the opposite direction. Any vertical or horizontal movement of the float produces oscillation of the lever and through the medium of the gears 33, 34, and 36 this motion is transmitted to the shaft 23. The inclined surfaces 43$^a$ and 43$^b$ of the float are for the purpose of using undercurrents occurring in the body of water and in a manner to reciprocate the lever L and to thereby oscillate the arms 30 thus effecting further propulsion of the shaft 23.

By reason of the swivel connection between the yoke 38 and the float frame 42, the float automatically adapts itself to variable surface undulations of the water and in a manner to utilize the power of the undulations in effecting both reciprocation and oscillation of the lever L. By reason of the rotatable head 18, the lever L, together with the arms 30 and the float F, can move bodily about the shaft 21 as a center, and manifestly the float is thus rendered capable of automatically adapting itself to every change of tide or flow so that it will at all times occupy a position in which it will operate to either reciprocate or oscillate the lever L and the arms 30 and thereby effect propulsion of the shaft 23 in one direction or the other. It may be said that the motor is universally movable under the action of the water to occupy any position in which it will respond to the maximum movements of the water so that irrespective of any change in the tide or direction of flow of the water, either superficial or deep, the motor will automatically adapt itself to such change and in a manner to cause it to respond to the power impulses whereby a continuous flow and maximum conversion of power is produced.

The transmission of the power developed by the motor to any remote point can be effected by the provision of the shaft 24 which, as shown in Fig. 1, is encased within a pipe 44 connected to the standard 16 at one end and extending to the shore or any other suitable point so as to completely house the shaft. The power as transmitted by the shaft 24 can be utilized in any manner desired.

Although I have herein shown and described only one type of wave motor, it is to be understood that various changes and modifications may be made herein without departing from the spirit of the invention and the spirit and scope of the appended claims.

I claim:

1. A motor of the character described comprising an arm mounted for pivotal movement about one axis and for bodily movement about another axis, a float on the arm, a driven member, and means operatively connecting the arm and member by which any movement of the arm causes rotational movement of the driven member.

2. A motor of the character described comprising an arm mounted for vertical movement about one axis and rotational movement about another axis, a float on the arm, a driven member, and means operatively connecting the arm and member by which vertical and horizontal movements of the arm cause rotational movement of the driven member.

3. A motor of the character described comprising an arm mounted for rocking movement about one axis and lengthwise movement about another axis, a float on the arm, a driven member, and means operatively connecting the arm and member by which any movement of the arm causes rotational movement of the driven member.

4. A motor of the character described comprising a rotatable support, arms pivoted on the support, a lever pivoted on the arms, a float on the lever, a driven member, and means by which movement of the arms and lever, separately and together, causes rotational movement of the driven member.

5. A motor of the character described comprising a support rotatable about a vertical axis, arms pivoted on the support to swing about a horizontal axis, a lever pivoted on the arms to swing about a horizontal axis, a float on the lever, a driven member, and means operatively connecting the driven member with the arms and lever by which any movement of the lever and arms causes rotational movement of the driven member.

6. A motor of the character described comprising a rotatable support, a shaft journaled in the support, arms pivoted on the support, a lever pivoted on the arms, a float on the lever, and means for transmitting movement of the arms and lever to said shaft.

7. A motor of the character described comprising a support rotatable about a vertical axis, a shaft journaled horizontally in the support, arms pivoted on the support, a lever pivoted on the arms, a float on the lever, and means for transmitting movement of the arms and lever to said shaft.

8. A motor of the character described comprising a rotatable support, a shaft journaled in the support, arms pivoted on the support, a lever pivoted on the arms, a float on the lever, and means for transmitting movement of the arms and lever to said shaft comprising gears mounted in the arms and operatively connected to the shaft and lever.

9. A motor of the character described comprising a rotatable support, a shaft journaled in the support, arms pivoted on the support, a lever pivoted on the arms, a float on the lever, and means for transmitting movement of the arms and lever to said shaft, said means being disposed on the arms.

10. A motor of the character described comprising an arm mounted for movement about a plurality of axes, a float swiveled on the arm, a driven member, and means operatively connecting the arm and member by which any movement of the arm causes rotational movement of the driven member.

11. A motor of the character described comprising an arm mounted for oscillatory and reciprocatory movements, a float on the arm, a drive member, and means operatively connecting the arm and member by which any movement of the arm causes rotational movement of the member.

12. A motor of the character described comprising an arm mounted for movement about a plurality of axes, a float on the arm, a driven member, means operatively connecting the arm and member by which any movement of the lever causes rotational movement of the driven member, a second driven member, and means operatively connecting the two members for causing the first member to drive the second member in one direction only.

13. A motor of the character described comprising a standard, a head rotatable on the standard about a vertical axis, a shaft journaled horizontally in the head, arms pivoted on the shaft, a lever pivoted on the arms, a float on the lever, and means on the arms for transmitting motion of the lever on the arms and motion of the arms on the shaft in a manner to rotate the shaft.

14. In a motor of the character described, a pivoted lever, and a float rotatable on and about the major axis of the lever.

15. In a motor of the character described, a float having an inverted V-shaped bottom and an upwardly curved top.

16. A motor as embodied in claim 13 wherein the float is swiveled on the lever.

17. A motor as embodied in claim 13 wherein the float is swiveled on the lever, and the float is provided with converging sides and an upwardly curved top.

CHESTER E. SHULER.